United States Patent [19]

Matsuura

[11] Patent Number: 5,531,198
[45] Date of Patent: Jul. 2, 1996

[54] FUEL INJECTION CONTROL SYSTEM FOR AUTOMOBILE ENGINE

[75] Inventor: Takashi Matsuura, Tokyo, Japan

[73] Assignee: Fuji Jukogyo Kabushiki Kaisha, Tokyo, Japan

[21] Appl. No.: 425,508

[22] Filed: Apr. 20, 1995

[30] Foreign Application Priority Data

May 19, 1994 [JP] Japan ................................ 6-105759

[51] Int. Cl.⁶ ..................................................... F02D 41/20
[52] U.S. Cl. ........................... 123/294; 123/490; 361/154
[58] Field of Search ................................... 123/490, 294; 361/154

[56] References Cited

U.S. PATENT DOCUMENTS

| | | | |
|---|---|---|---|
| 4,173,030 | 10/1979 | Rabe | 123/490 X |
| 4,234,903 | 11/1980 | Harper | 123/490 X |
| 4,347,544 | 8/1982 | Ohba | 123/490 X |
| 5,267,545 | 12/1993 | Kitson | 123/490 |

FOREIGN PATENT DOCUMENTS 60-26136  2/1985  Japan.
63-55345  3/1988  Japan.

*Primary Examiner*—Tony M. Argenbright
*Attorney, Agent, or Firm*—Beveridge, DeGrandi, Weilacher & Young

[57] ABSTRACT

After an injector current for opening a fuel injector is fed thereto, energization on the fuel injector is stopped to reduce the injector current towards a holding current level for keeping the fuel injector at an open state, a flywheel circuit being inoperative. Before a closed loop for controlling the injector current at the holding current level is formed, the flywheel circuit is made operative, whereby an influence of the operational delay of a circuit forming the closed loop can be reduced and further the injector current can be swiftly transferred to the holding current level before it falls largely.

7 Claims, 11 Drawing Sheets

FUEL INJECTION CONTROL SYSTEM FOR AUTOMOBILE ENGINE

BACKGROUND OF THE INVENTION

1. Field of the Invention

The present invention relates to a fuel injection control system for an automobile engine and more specifically to a fuel injector driver circuit for controlling a current passing through a fuel injector of an engine.

2. Description of the Prior Art

Generally, in a fuel injection system wherein fuel is fed to an engine by way of injecting pressurized fuel through a fuel injector composed of a solenoid valve, the current passing through the fuel injector is controlled through a driver circuit in order to expand the dynamic range of the fuel injector by giving a high speed operation thereto. In the driver circuits disclosed in the prior art, there are proposed so many techniques in which when an injection pulse indicating an injection timing is inputted, initially a relatively high current is fed to the fuel injector in order to open the fuel injector at high speed and after that it is once deenergized to step down the current value, then the current passing through the fuel injector is controlled so as to keep a low holding current enough to hold the fuel injector in an open state by performing a closed loop control by means of detecting the current passing through the fuel injector. In this type of driver circuit, there is provided a socalled flywheel circuit for discharging counter electromotive force generated in a coil of the fuel injector when the current is shut down. When this flywheel circuit is energized upon switching the current from the valve opening current to the holding current, the falling speed of the current passing through fuel injector is slowed down and additionally the current is decreased along a curved line determined by a a time constant of the coil of the fuel injector. The period needed for switching from the valve opening current to the holding current is called "dead zone" that may cause fuel metering errors and other failures.

Because of this, for example Japanese Unexamined Patent Publication No. Toku-Kai-Sho 60-26136 discloses a technique in which the flywheel circuit is deenergized during the falling period of the current passing through the coil from the high current for valve opening to the holding current. Further, in Japanese Unexamined Patent Publication No. Toku-Kai-Sho 63-55345, the relationship between the flywheel control and the holding current control is disclosed.

In the prior art of the above Toku-Kai-Sho 63-55345, two pairs of comparators are provided in order to compare the voltage of a resistor for detecting the current flowing through the fuel injector with the reference voltage value. In this prior art, after the fuel injection pulse is inputted and the transistor for driving the fuel injector is energized, when the voltage of the resistor for detecting the current through the fuel injector exceeds a first reference voltage set higher than the voltage corresponding to the valve opening current, the above transistor is deenergized to reduce the current through the fuel injector by a signal outputted from one comparator. Further, when the voltage of the above resistor goes down to a level below a second reference voltage value, the current through the fuel injector is controlled so as to come into the predetermined range of the holding current and at the same time the flywheel circuit is switched from the OFF to ON condition by an output signal of the other comparator.

However, in a case where the current passing through the fuel injector is stepped down from the high current for the valve opening while the flywheel circuit is deenergized, the falling speed of that current is so large that it becomes unable to ignore the operational delay of the circuits forming the closed-loop, such as a current detecting circuit, a control circuit for drive current and/or the like. Accordingly, as in the prior art Toku-Kai-Sho 63-55345, when the timing for energizing the flywheel circuit is determined on the assumption that this delay is null or small enough to be able to be ignored, as shown by broken lines in FIG. 4 or illustrated in FIG. 12, the current passing through the fuel injector goes down to a fairly low level for the period from the instance that the current of the fuel injector, namely the drive current thereof is detected by the current detecting resistor to the instance that the drive transistor is energized.

As a result of this, the current passing through the fuel injector becomes lower than the holding current value and finally the fuel injection might be stopped before the fuel injection pulse ceases. Especially in fuel injectors for the direct injection type engine wherein high pressure fuel is injected a large electromagnetic force is needed compared to ordinarily used injectors for the port injection type engine and accordingly the current for valve opening is also high (for example, approximately 10 A). In this case, therefore, when the current is stepped down from a high level while the flywheel circuit is deenergized, the falling speed of current becomes faster and the operational delay of circuits becomes larger than in case of conventional engines. Accordingly, in a case where this prior art is applied to a direct injection type engine, there is a very high possibility that such troubles as injection stall or the like occur.

SUMMARY OF THE INVENTION

It is an object of the present invention to provide a fuel injection control system capable of injecting fuel with a high accuracy.

It is a further object of the present invention to provide a fuel injection control system free from failures such as injection stall and the like.

To accomplish these objects, the present invention provides a fuel injector drive circuit comprising flywheel circuit control means for operating a flywheel circuit while the current passing through a fuel injector is falling from the valve opening current level for initially opening the fuel injector with said flywheel circuit being inoperative and before the closed control circuit which controls the current at a holding current level for keeping the fuel injector open is operative.

DETAILED DESCRIPTION OF THE PREFERRED EMBODIMENT

Figure 6:
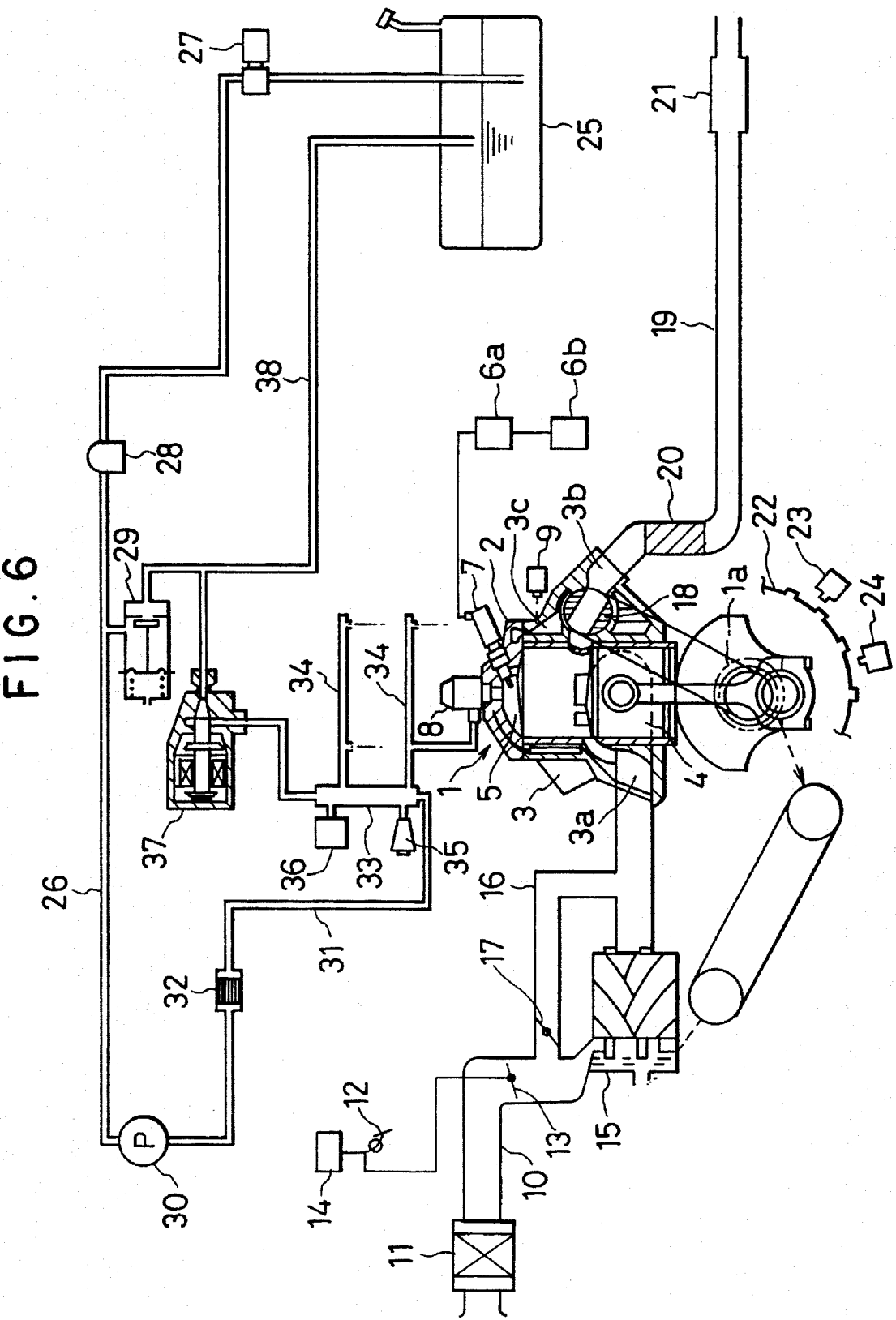
FIG. 6 is a schematic view showing an overall engine control system according to the present invention.

Referring now to FIG. 6, numeral 1 denotes a high pressure fuel injection engine (in this embodiment a direct fuel injection type two cycle four cylinders engine is shown). A spark plug 7 connected to a secondary side of an ignition coil 6a and a fuel injection valve (hereinafter referred to as a fuel injector) 8 are disposed in a combustion chamber 5 which comprise a cylinder head 2, a cylinder block 3 and a piston 4 and an igniter 6b is connected to a primary side of the ignition coil 6a.

Further, the cylinder block 3 is provided with a scavenging port 3a and an exhaust port 3b. A coolant temperature sensor 9 is disposed in a coolant passage 3c formed in the cylinder block 3. A delivery pipe 10 is connected with the scavenging port 3a and upstream of the delivery pipe 10 an air cleaner 11 is installed. A throttle valve 13 which is opened and closed responsive to the movement of an accelerator pedal 12 is disposed downstream of the air cleaner 11. An accelerator pedal opening angle sensor 14 is coupled with the accelerator pedal 12.

A scavenging pump 15 is disposed downstream of the throttle valve 13. The scavenging pump 15 driven by the rotational movement of a crank shaft 1a acts as supplying fresh air to the combustion chamber 5 and forcibly scavenging exhaust gas. Further, a by-pass valve 17 which is opened and closed by an actuator (not shown) is disposed in a by-pass passage 16 by-passing the scavenging pump 15. Further, an exhaust rotary valve 18 which is opened and closed according to the rotation of the crank shaft la is provided at the exhaust port 3b and downstream of the exhaust rotary valve 18 an exhaust pipe 19 is provided. Further, there is provided a catalytic converter 20 upstream of the exhaust pipe 19 and a muffler 21 is connected to a downstream end thereof.

Further, a crank rotor 22 for detecting crank angles is coaxially fixed to the crank shaft 1a mounted on the cylinder block 3. A crank angle sensor 23 composed of an electromagnetic pick-up or the like is disposed adjacent to the outer periphery of the crank rotor 22. Also a crank rotor (not shown) for discriminating cylinder numbers is fixedly connected to the crank shaft 1a coaxially with the crank rotor 22 for detecting crank angles. A cylinder number discriminating sensor 24 composed of an electromagnetic pick-up or the like is disposed adjacent to the crank rotor for discriminating cylinder numbers.

Further, numeral 25 denotes a fuel tank from which fuel is fed to a high pressure fuel pump 30 through a low pressure fuel passage 26. A feed pump 27 and a fuel filter 28 are disposed in the fuel passage 26 in this order and fuel regulated by a diaphragm type pressure regulator 29 for low pressure fuel is fed to the high pressure fuel pump 30. Further, a high pressure fuel filter 32 is provided in a high pressure fuel passage 31 communicating the high pressure fuel pump 30 with an electromagnetic type pressure regulator 37 for high pressure fuel. A fuel chamber 33 is provided between the high pressure fuel filter 32 and the electromagnetic type fuel regulator 37 for high pressure fuel. The fuel chamber 33 has a plurality of diverted fuel feed lines 34 for feeding fuel to the fuel injector 8 of each cylinder therethrough. Further, the fuel chamber 33 communicates with an accumulator 35 for damping the pulsation of fuel pressure and to a fuel pressure sensor 36 for detecting fuel pressure.

A fuel discharge line of the diaphragm type pressure regulator 29 is connected with a fuel discharge line of the electromagnetic type pressure regulator 37 on a fuel return passage 38 for returning residual fuel to the fuel tank 25 after being regulated at each pressure regulator.

The electromagnetic type pressure regulator 37 comprising, for example, a linear solenoid or the like controls fuel pressure so as to be regulated at a required pressure in such a way that when a fuel pressure signal detected by the fuel pressure sensor 36 is inputted to an electronic control unit 40 which will be described hereinafter, the driver current outputted from the electronic control unit 40 is fed to the electromagnetic type pressure regulator 37 so as to regulate the amount of fuel to be returned to the fuel tank 25 therein.

Figure 7:
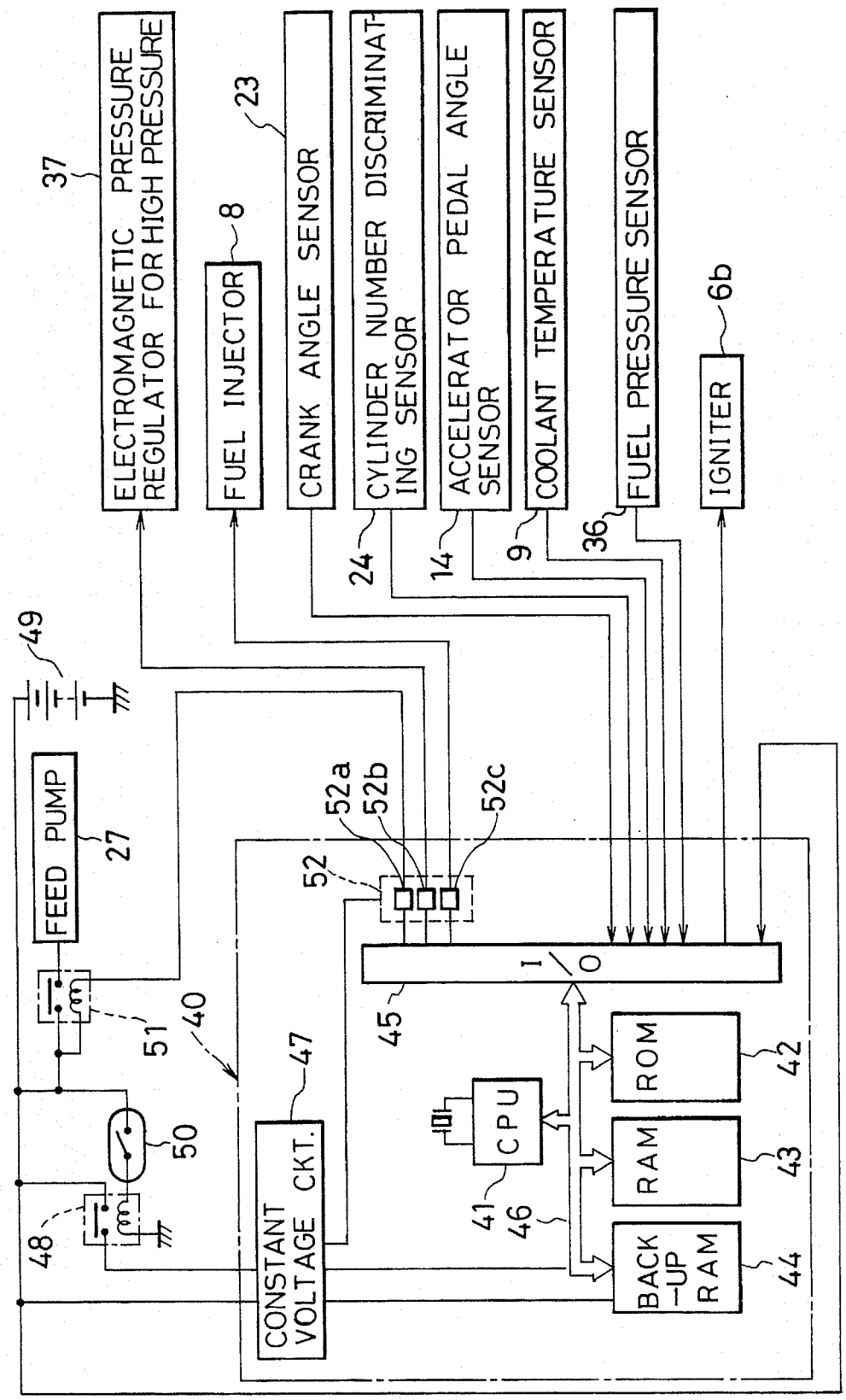
FIG. 7 is a schematic view showing an electronic control system according to the present invention.

On the other hand, referring to FIG. 7, numeral 40 denotes an electronic control unit (ECU) comprising such devices as a CPU 41, a ROM 42, RAM 43, a backup RAM 44, an I/O interface 45 and a bus line 46 connected with each of these devices. The CPU 41 has a constant voltage circuit 47 for supplying stabilized voltage to each device in the ECU 40. This constant voltage circuit 47 is connected with a battery 49 through a relay contact of an ECU relay 48 and further the battery 49 is directly connected with the RAM 44 continuously to apply a backup voltage thereto.

Further, the battery 49 is connected with a relay coil of the ECU relay 48 through an ignition switch 50 and with the aforementioned feed pump 27 through a relay contact of a feed pump relay 51. Further, the battery 49 is connected with an input port of the I/O interface 45 to monitor the battery voltage. Further, the input port of the I/O interface 45 is connected with the coolant temperature sensor 9, the accelerator pedal opening angle sensor 14, the crank angle sensor 23, the cylinder numbers discriminating sensor 24 and the fuel pressure sensor 36 respectively.

On the other hand, an output port of the I/O interface 45 is connected with the igniter 6b for driving the ignition coil 6a and additionally with a driver circuit 52 comprising a relay drive circuit 52a for driving the relay coil of the feed pump relay 51, a pressure regulator drive circuit 52b for driving the electromagnetic type pressure regulator 37 and an injector drive circuit 52c for driving the fuel injector 8. When an injection pulse signal indicating the injection timing of the fuel injector 8 is inputted to the injector drive circuit 52c, it initially feeds a relatively high current to the fuel injector 8 in order to open the fuel injector 8 at high speed and after that the injector drive circuit 52c is controlled so as to feed a relatively low holding current enough to hold the injection valve at the open state, as details will be described hereinafter.

Next, the constitution of the injector drive circuit 52c will be described.

Figure 1:
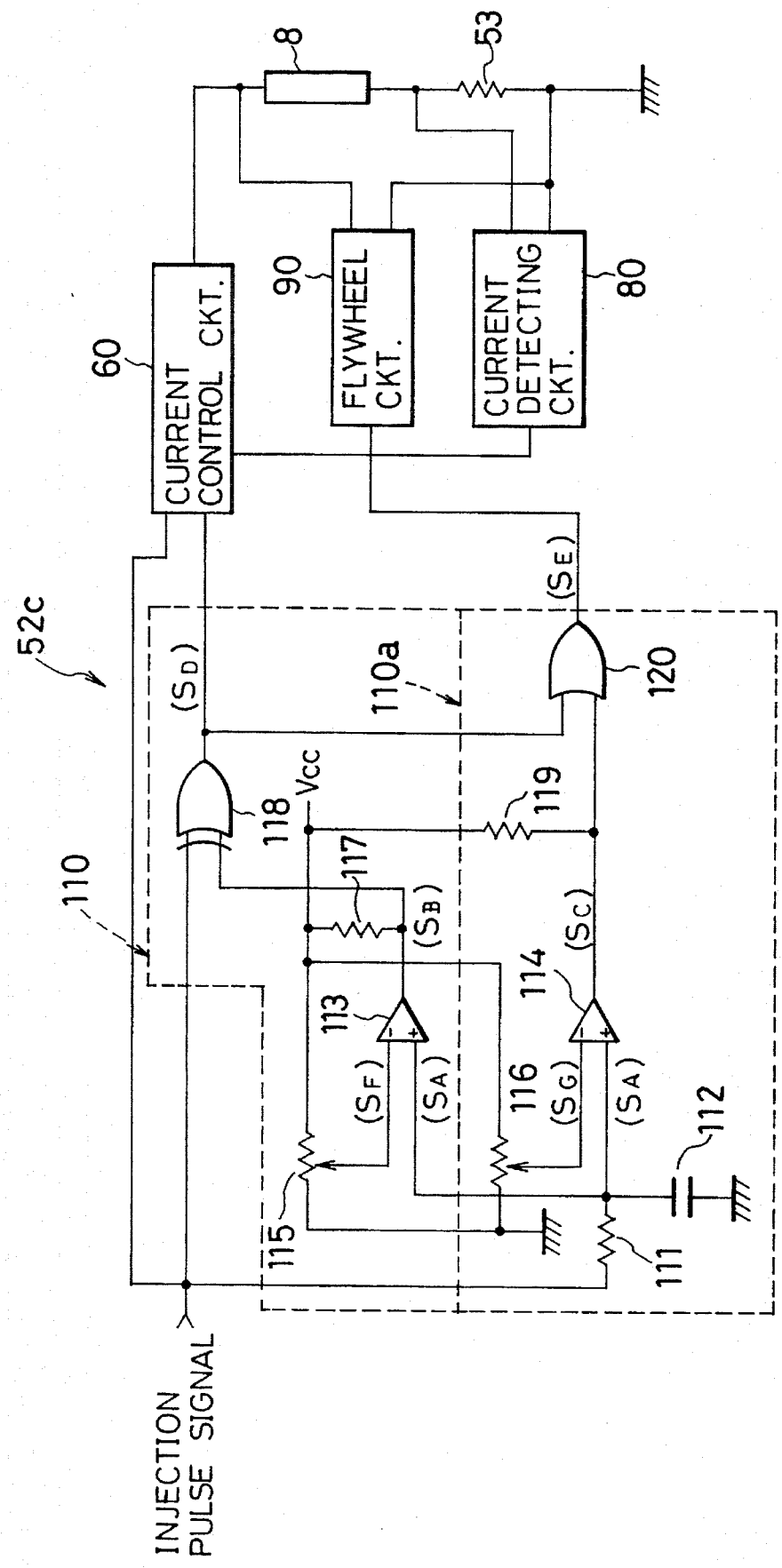
FIG. 1 is a diagrammatic view of a driver circuit for fuel injectors according to a first embodiment of the present invention.

Referring to FIG. 1, the injector drive circuit 52c comprises a current control circuit 60 for controlling the current passing through the coil of the injector 8, a current detecting circuit 80 for detecting the current passing through the fuel injector 8 by the terminal voltage of a resistor 53 connected in series with the fuel injector 8, a flywheel circuit 90 for discharging counter electromotive force produced when the fuel injector is deenergized and a timing signal generating circuit 110 for generating timing signals to control operations of the above current control circuit 60 and the flywheel circuit 90.

The injection pulse signal is inputted both to the current control circuit 60 and the timing signal generating circuit 110. In the timing signal generating circuit 110 a valve opening pulse signal for indicating to feed a valve opening current on the fuel injector 8 is generated and simultaneously a flywheel circuit control signal for controlling the operation of the flywheel circuit 90 based on the valve opening pulse signal is also generated.

Further, in the timing signal generating circuit 110, after the injection pulse signal is delayed by an integrating circuit composed of a resistor 111 and a condenser 112, it is inputted to an non-inverting input terminal of comparators 113 and 114 respectively. On the other hand, to an inverting input terminal of the comparators 113 and 114 a reference voltage $V_{REF1}$ and $V_{REF2}$ is applied respectively through an adjustable resistor 115 and 116 from a constant voltage source $V_{CC}$. Either of comparators 113 and 114 is an open corrector type comparator. An output terminal of the comparator 113 is connected with the constant voltage source $V_{CC}$ through a resistor 117 and also connected with one of two input terminals of an EX-OR gate 118 to which the injection pulse signal is inputted through the other input terminal thereof. Further, an output of the comparator 114 is connected with the constant voltage source $V_{CC}$ through a resistor 119 and also connected with one of two input terminals of an OR gate 120.

An output terminal of the EX-OR gate 118 is connected with the other input terminal of the OR gate 120 and the current control circuit 60. Further, an output terminal of the OR gate 120 is connected with the flywheel circuit 90.

The reference voltage $V_{REF2}$ adjusted by the adjustable resistor 116 is set higher than the reference voltage $V_{REF1}$ by the adjustable resistor 115. As will be described hereinafter, the timing for switching the current passing through the fuel injector 8 from the high current at the valve opening to the holding current is determined based on the reference voltage $V_{REF1}$ and on the other hand the timing for operating the flywheel circuit 90 is determined based on the reference voltage $V_{REF2}$ before a closed loop is formed at the start of controlling the holding current of the fuel injector 8.

A circuit generating the timing for operating the above-mentioned flywheel circuit 90, i.e., flywheel circuit control means comprises an integrating circuit including the resistor 111 and the capacitor 112, the adjustable resistor 116, the comparator 114, the resistor 119 and the OR gate 120.

Symbols shown in FIG. 1 such as $S_A$, $S_B$ etc. are defined as follows: $S_A$ is a terminal voltage signal of the capacitor 112; $S_B$ is an output signal of the comparator 113; $S_C$ is an output signal of the comparator 114; $S_D$ is an output signal of the EX-OR gate 118 or a pulse signal for determining the valve opening current duration; $S_E$ is an output signal of the OR gate 120 or a control signal of the flywheel circuit thereof; $S_F$ is a signal applied to the inverting input terminal (reference voltage $V_{REF1}$) of the comparator 113; and $S_G$ is a signal applied to the inverting input terminal (reference voltage $V_{REF2}$).

Figure 2:
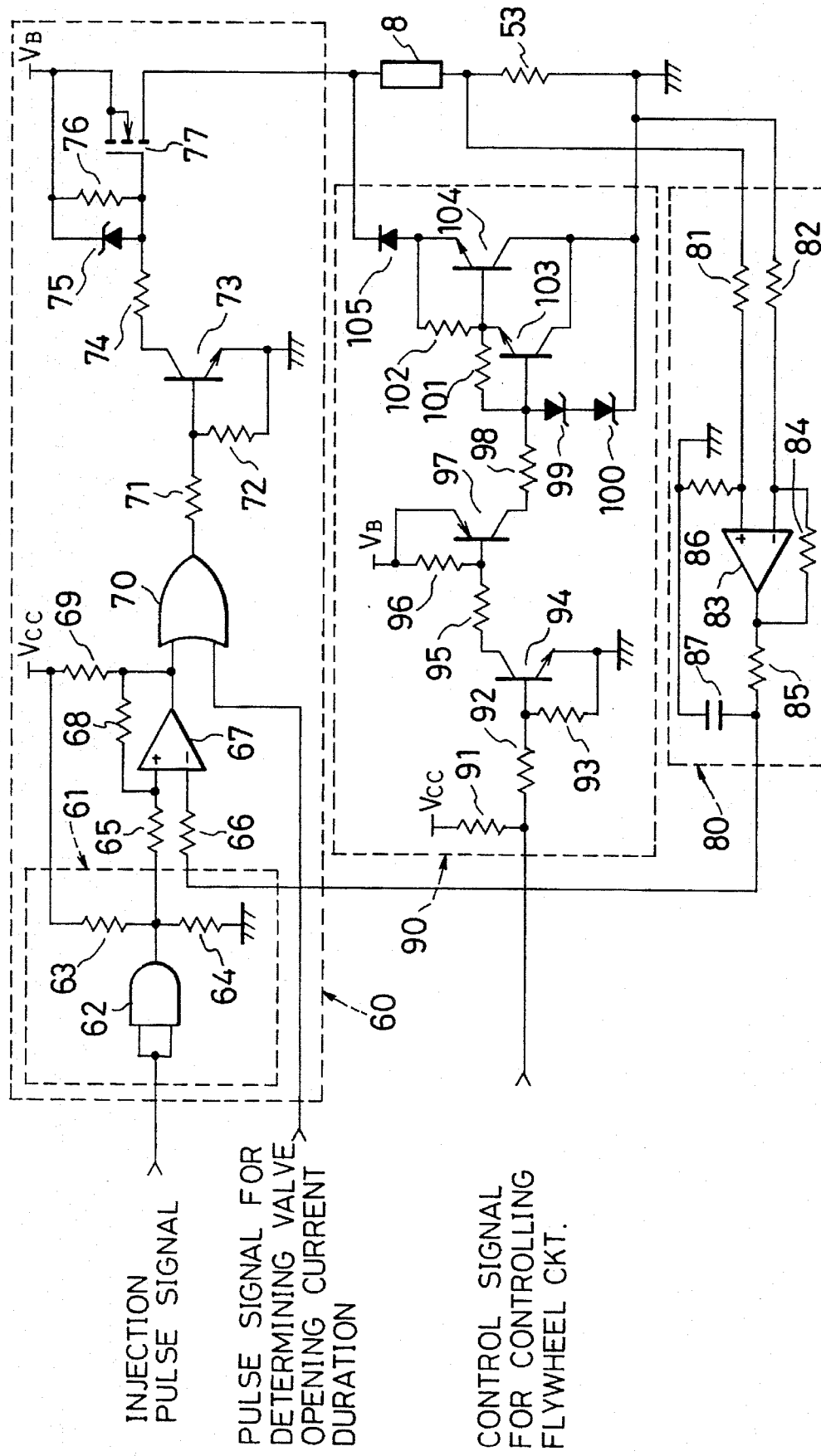
FIG. 2 is a diagrammatic view showing a current control circuit, a flywheel circuit and a current detecting circuit according to a first embodiment of the present invention.

Referring to FIG. 2, this drawing illustrates an exemplary circuit of the current control circuit 60, the current detecting circuit 80 and the flywheel circuit 90, although other well-known circuits may be applied to.

In the current control circuit 60, a reference voltage generating circuit 61 is constituted of an open collector type AND gate 62 to which an injection pulse is inputted and divider resistors 63 and 64 for dividing the constant voltage source $V_{CC}$. An output terminal of the AND gate 62 is connected with a junction point of those divider resistors 63 and 64.

A reference voltage output generated from the reference voltage generating circuit 61 is applied to a non-inverting input terminal of the comparator 67 through a resistor 65. On the other hand, an output voltage of the current detecting circuit 80 is applied to an inverting input terminal of the comparator 67 through a resistor 66. The comparator 67 has a Schmidt characteristic therein and its output terminal is connected both with the constant voltage source $V_{CC}$ and with the non-inverting input terminal thereof through a feedback resistor 68. That is to say, the voltage applied to the non-inverting input of the comparator 67 has such a hysteresis as being an upper and lower threshold levels $V_L$ and $V_H$ ($V_L<V_H$) with the reference voltage from the reference voltage generating circuit 61 being centered and is compared with the output voltage of the current detecting circuit 80, whereby the current of the fuel injector 8 is controlled so as to become the holding current.

Further, the output terminal of the comparator 67 is connected with one input terminal of the OR gate 70. The other input terminal of the OR gate 70 is connected with the timing signal generating circuit 110 to input the valve opening pulse signal therethrough. An output terminal of the OR gate 70 is connected through a resistor 71 with a base of a NPN type transistor 73 whose base terminal is grounded through a base bias resistor 72 and whose emitter is also grounded. A collector of the transistor 73 is connected with a gate of a power MOS.FET 77 through a resistor 74.

A source of the power MOS.FET 77 is connected with a battery power source $V_B$ and across the power source and the gate of the power MOS.FET 77 a constant voltage diode 75 (having a reverse direction to the battery power source $V_B$) and a resistor 76 are connected in parallel. Further, a drain of the power MOS.FET 77 is connected with one terminal of the fuel injector 8. The other terminal of the fuel injector 8 is grounded through a current detecting resistor 53 whose both end terminals are connected with the current detecting circuit 80.

The current detecting circuit 80 includes an operational amplifier 83 for amplifying the terminal voltage of the current detecting resistor 53. A non-inverting input terminal of the operational amplifier 83 is connected with the fuel injector 8 through a resistor 81 and an inverting input terminal is connected with a ground side of the current detecting resistor 53 through a resistor 82.

An output terminal of the operational amplifier 83 is connected both with the inverting input terminal thereof through a feedback resistor 84 and with one end of a resistor 85. The other end of the resistor 85 is grounded through a condenser 87 and also connected with the inverting input terminal of the comparator 67 through the resistor 66 of the current control circuit 60. Further, a non-inverting input terminal of the operational amplifier 83 is grounded through a resistor 86.

In the flywheel circuit 90, the flywheel circuit control signal from the timing signal generating circuit 110 is inputted to a base of a NPN type transistor 94 through a resistor 92. An emitter of the transistor 94 is grounded and a base terminal thereof is grounded through a base bias resistor 93. A collector of the transistor 94 is connected with a base of a PNP type transistor 97 through a resistor 95. The battery power source $V_B$ is connected both with the base of the transistor 97 through a resistor 96 and with an emitter thereof.

Further, a collector of the transistor 97 is connected with a base of a NPN type transistor 103 through a resistor 98. Further this transistor 103 has a Darlington connection with a NPN type transistor 104. That is to say, the collector of transistors 103 and 104 is connected with each other and an emitter of the transistor 103 is connected with a base of the transistor 104. Further, resistors 101 and 102 are provided between the base and emitter of transistors 103 and 104 respectively.

Further, the emitter of the transistor 104 is connected with a junction point of the drain of the power MOS.FET 77 in the current control circuit 60 and the fuel injector 8 through a diode 105 with its polarity oriented in a forward direction. The base of the transistor 103 is connected with each collector of transistors 103 and 104 through serial constant voltage diodes 99 and 100 with their polarities oriented in the forward direction, and further grounded through those constant voltage diodes 99 and 100.

In the construction of circuits thus constituted, referring to the wave form charts shown in FIG. 3 through FIG. 5, the operation of the injector drive circuit 52c will be described.

In the timing signal generating circuit 110, when an injection pulse signal with high level is inputted, the capacitor 112 is charged through the resistor 111 of the integrating circuit and the terminal voltage ($S_A$ denoting a delayed signal of the above injection pulse signal) of the capacitor 112 is applied to each non-inverting input terminal of the comparators 113 and 114 respectively. The output signals $S_B$ and $S_C$ of the comparators 113 and 114 respectively both become the low level, when the terminal voltage (signal $S_A$) of the capacitor 112 is lower than the reference voltages $V_{REF1}$ and $V_{REF2}$ (signals $S_F$ and $S_G$ respectively) applied to each inverting input terminal of the comparators 113 and 114. Further, at this time, the output signal $S_D$ of the EX-OR gate 18 and the output signal $S_E$ of the OR gate 120, both become the high level.

When the capacitor is charged further and the signal $S_A$ applied to the non-inverting input terminal of the comparator 113 exceeds the signal $S_F$ applied to the inverting input terminal thereof, the output signal $S_B$ of the comparator 113 is switched to the high level and also the output signals of the EX-OR gate 118 and the OR gate 120 become the low level.

Figure 3:
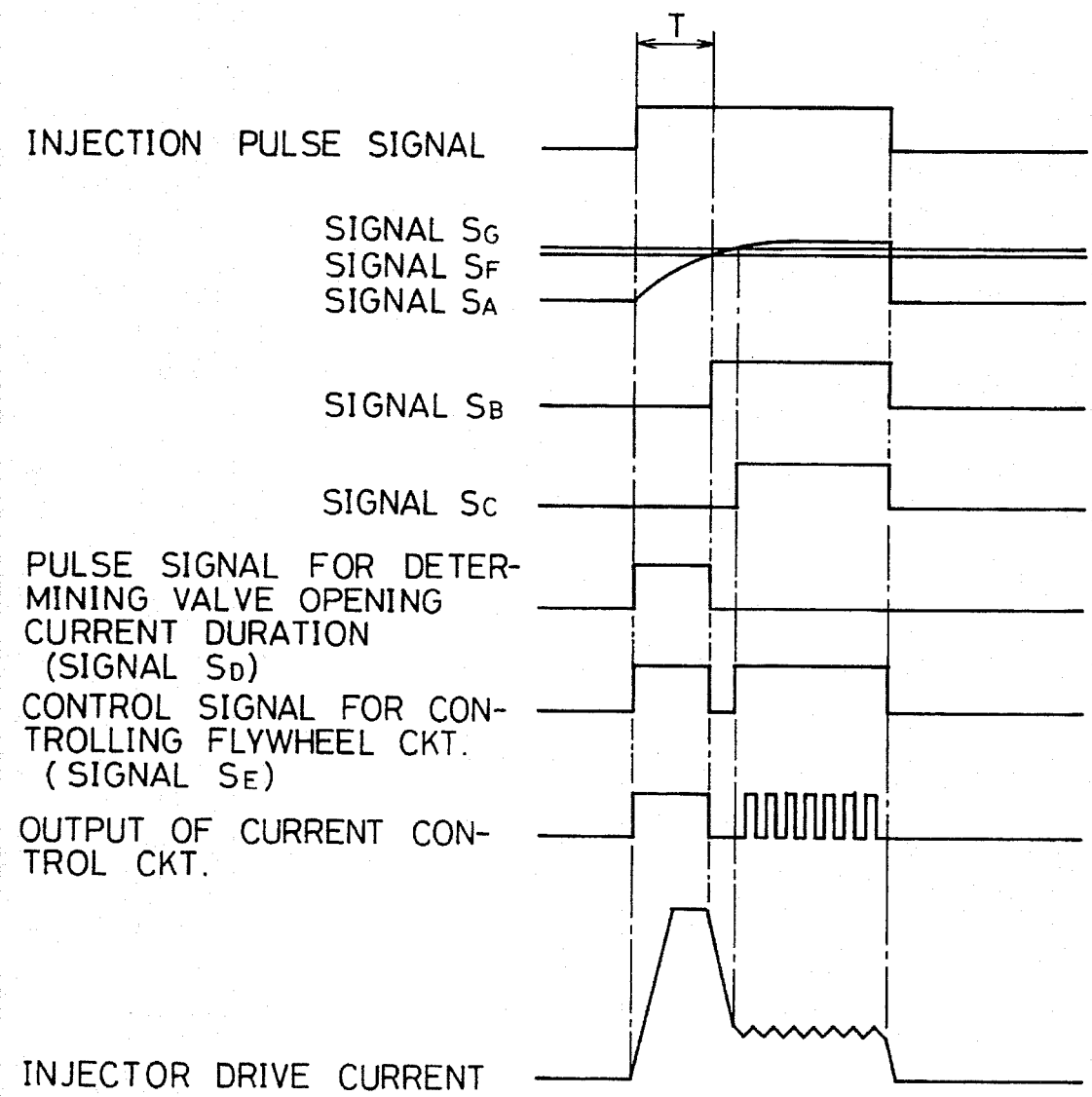
FIG. 3 is a diagram showing wave shapes of signals associated with a first embodiment of the present invention.

That is, as illustrated in FIG. 3, the pulse signal $S_D$ for feeding a high current to the fuel injector 8 at the start of the valve opening is formed during the period of time T from the input of the injection pulse until the changeover of the output of the comparator 113. In the current control circuit 60, during that period T the output signal of the OR gate 70 becomes the high level independent of an output status of the comparator 67. As a result, the transistor 73 is energized and succeedingly the power MOS.FET 77 is energized, whereby the fuel injector 8 is energized. The coil of the fuel injector 8 has a small time constant in order to raise a response speed thereof. By raising the response speed, it is possible to step up the current sharply and therefore to feed high current within a very short period of time, thereby the fuel injector is opened at high speed to inject high pressure fuel directly into the combustion chamber 5 of the engine 1.

At this time, the high level signal $S_E$ (a logical sum of the high level signals $S_D$ and $S_C$) for controlling the flywheel circuit is inputted to the flywheel circuit 90. This high level signal $S_E$ makes the transistors 94 and 97 ON, however the transistors 103 and 104 remain OFF because they are grounded through the diodes 99 and 100. The current passing through the fuel injector 8 flows through the current detecting resistor 53. The terminal voltage of the resistor 53 is amplified by the operational amplifier 83 in the current detecting circuit 80 and after that it is applied to the inverting input terminal of the comparator 67 in the current control circuit 60. At this time, when the voltage applied to the inverting input terminal exceeds a reference level $V_H$ of the non-inverting input side, the output signal of the comparator 67 becomes the low level.

After the period T elapses, the signal $S_D$ becomes the low level and also the output signal of the comparator 67 becomes the low level. The output signal of the OR gate 70, therefore, becomes the low level, and as a result, the transistor 73 is deenergized and the power MOS.FET is deenergized to shut off the current passing through the fuel injector 8. Simultaneously, the output signal $S_E$ from the timing signal generating circuit 110, namely the input signal to the flywheel circuit 90 becomes the low level. As a result, the transistors 94 and 97 of the flywheel circuit 90 are deenergized. Since the transistors 103 and 104 are kept to be deenergized, the counter electromotive force generated in the coil of the fuel injector 8 is discharged to the battery power source side and the current passing through the fuel injector 8 goes down sharply.

With this state, when the capacitor 112 of the timing signal generating circuit 110 is still further charged and the level of the signal $S_A$ applied to the non-inverting input terminal of the comparator 114 is above that of the signal $S_G$ applied to the inverting input terminal thereof, the output signal $S_C$ of the comparator 114 is turned over to the high level and also the output signal $S_E$ of the OR gate 120 becomes the high level again.

Then, the transistor 94 of the flywheel circuit 90 is energized and succeedingly the transistor 97 is also energized. The transistors 103 and 104 are energized, because the bases of those transistors are biased in the forward direction by the counter electromotive force generated in the coil of the fuel injector 8, whereby an energy stored in the coil of the fuel injector 8 is discharged through the transistor 104 and the diode 105. As a result, as shown in FIG. 4, the falling speed of the current passing through the fuel injector 8 is attenuated.

The timing that the signal $S_E$ becomes the high level and operates the flywheel circuit 90, that is to say, the timing that the signal $S_C$ becomes the high level has been determined before the closed loop of the holding current control for the fuel injector 8 is formed. The closed loop of the holding current control is formed as follows. First, in the operating condition of the flywheel circuit 90, the terminal voltage of the current detecting resistor 53 is amplified by the operational amplifier 83 of the current detecting circuit 80 and applied to the inverting input terminal of the comparator 67. Then, when the voltage applied to the inverting input terminal of the comparator 67 goes down to the level below the reference level $V_L$ of the non-inverting input and the output signal of the comparator 67 turns over to the high level, the output signal of the OR gate 70 becomes the high level and the power MOS-FET 77 is energized, thus the closed loop of the holding current control is formed.

Describing in more detail, however, a time delay is caused due to the operational delay of the current detecting circuit 80 until the output of the comparator 67 is turned over to the high level. Additionally, an operational delay of the current control circuit 60 is added, therefore, some degree of time delay is caused between the energizing instant of the power MOS.FET 77 and the turnover instant of the current through the fuel injector 8 from the falling state to the rising state, even if the voltage of the current detecting resistor 53 reaches a target value $V_L'$ corresponding to the reference level $V_L$ at the non-inverting input terminal of the comparator 67.

Figure 4:
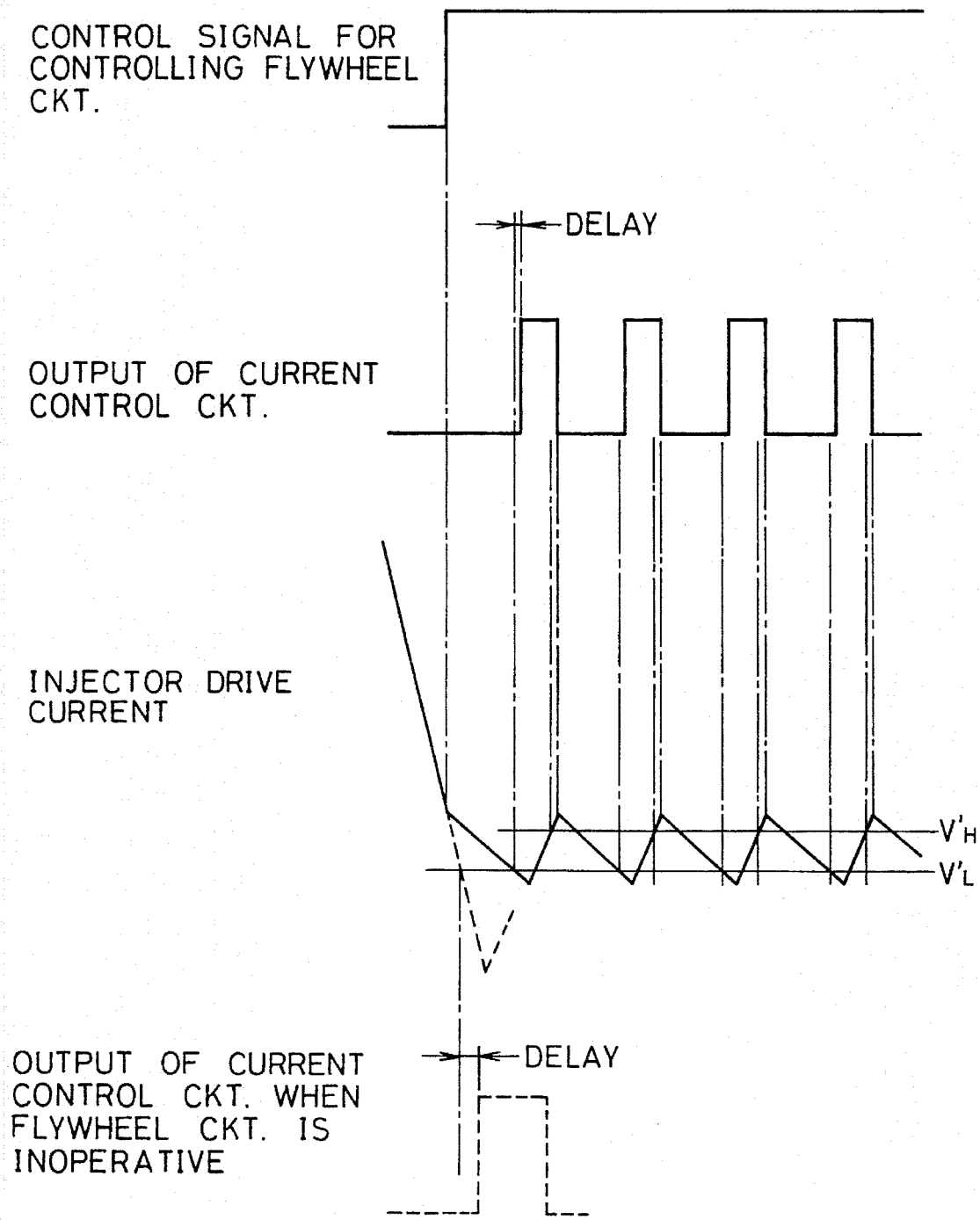
FIG. 4 is a diagram showing an example of the timing and wave shape of signals in the holding current control according to a first embodiment of the present invention.

Because of this, for example, as shown in FIG. 4, in order to turn over the output signal $S_C$ of the comparator 114 in the timing signal generating circuit 110 and to operate the flywheel circuit 90 before the voltage of the current detecting resistor 53 reaches the target value $V_L'$ corresponding to the reference level at the non-inverting input terminal of the comparator 67, with respect to the integrating circuit composed of the resistor 111 and the condenser 112, the reference voltage $V_{REF2}$ has been set at an appropriate value beforehand by adjusting the adjustable resistor 116 taking a time constant of the coil of the fuel injector 8, a resistance of the coil thereof, a battery voltage and the like into consideration.

Generally, the current drop in the fuel injector due to the time delay described above becomes large with an increase of the falling speed of the current passing through the fuel injector. In the prior art in which the time delay of the operation of the circuit is neglected, there is a likelihood that when the signal for driving the fuel injector is outputted at the instance that the voltage of the current detecting resistor reaches a target value, the current passing through the fuel injector drops excessively, as illustrated by broken lines in FIG. 4, hence the current may drop to a level where the valve-open state of the fuel injector can not be maintained any more, before the closed loop of the holding current control is formed to operate flywheel circuit.

On the other hand, according to the present invention, as shown in FIG. 4, since the flywheel circuit 90 is operated before the current passing through the fuel injector 8 (the drive current thereof) reaches the target value, i.e., the voltage of the current detecting resistor 53 becomes the target value $V_L'$, the falling speed of the current slows down. By virtue of this, not only an adverse effect of the operational delay of the circuit can be reduced to the minimum, but also the drop of the drive current passing through the fuel injector can be restrained to a level where the prompt transfer to the holding current control is capable.

Figure 5:
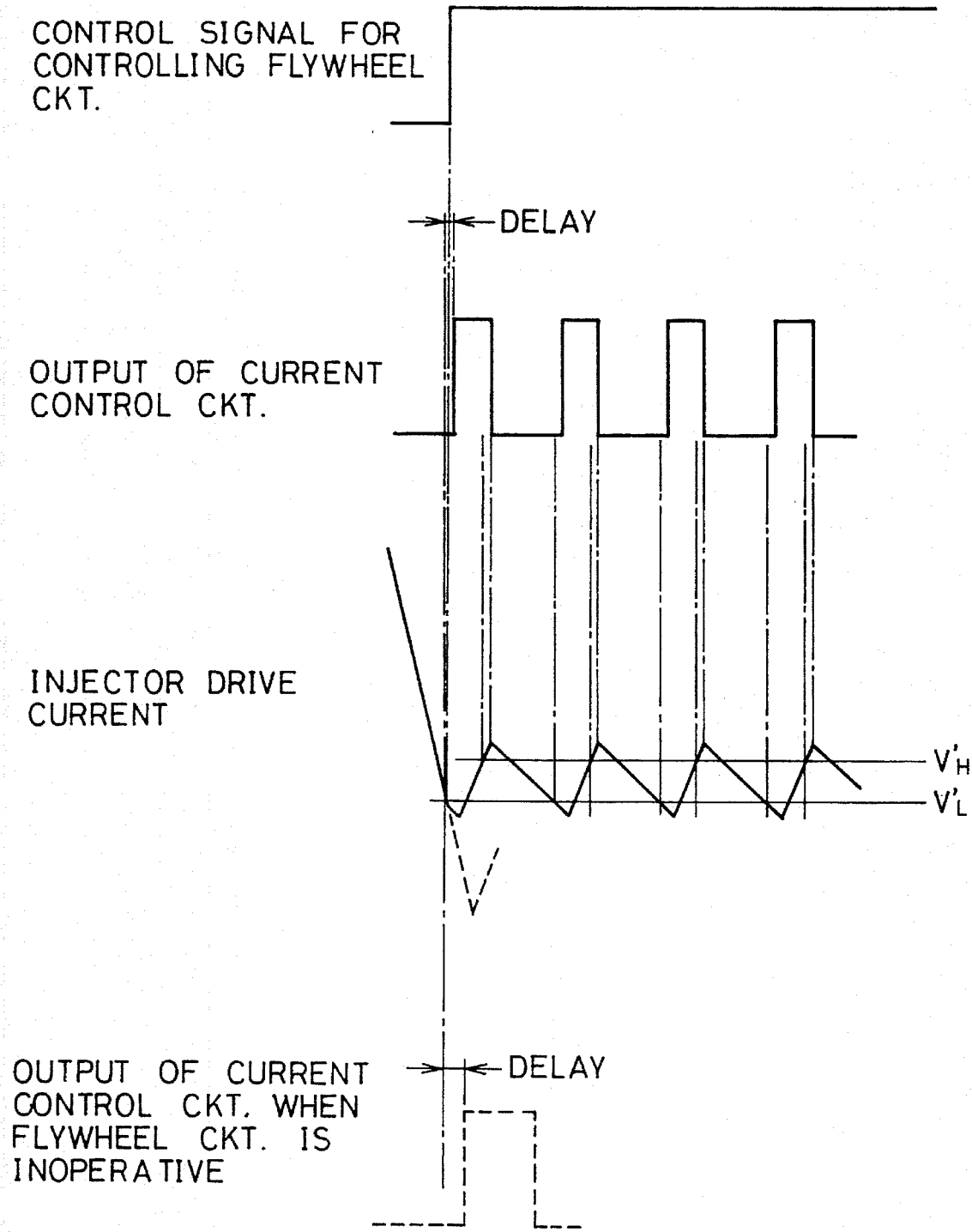
FIG. 5 is a diagram showing another example of the timing and wave shape of signals in the holding current control according to a first embodiment of the present invention.

In this case, as shown in FIG. 5, it is possible to place the timing for driving the flywheel circuit 90, immediately after the voltage of the current detecting resistor 53 reaches the target value $V_L'$ and before the closed loop for the holding current control is formed. That is, the falling speed of the current is made dull by starting to operate the flywheel circuit 90 immediately after the voltage of the current detecting resistor 53 reaches the target value $V_L'$. Thus, even if the formation of the closed loop for the holding current control is delayed due to the operational delay of the current detecting circuit 80 or the current control circuit 60, the current drop succeeding during that period can be prevented.

Further, when the power MOS. FET 77 of the current control circuit 60 is energized and the holding current control is started, the current flowing through the fuel injector 8 is stepped up. Then, when the voltage of the current detecting resistor 53 exceeds the voltage $V_H'$ corresponding to the reference level $V_H$ of the comparator 67, the output signal of the comparator 67 is turned over to the low level and the output signal of the OR gate 70 becomes the low level to deenergize the power MOS.FET 77. Further, the current flowing through the fuel injector 8 is controlled in a sawtooth shape by repeating these energizing and deenergizing operations, thus the valve-open state is maintained. When the injection pulse signal becomes the low level, operations in the circuits are ceased and accordingly the current flowing through the fuel injector 8 is terminated to stop fuel injection.

Figure 8:
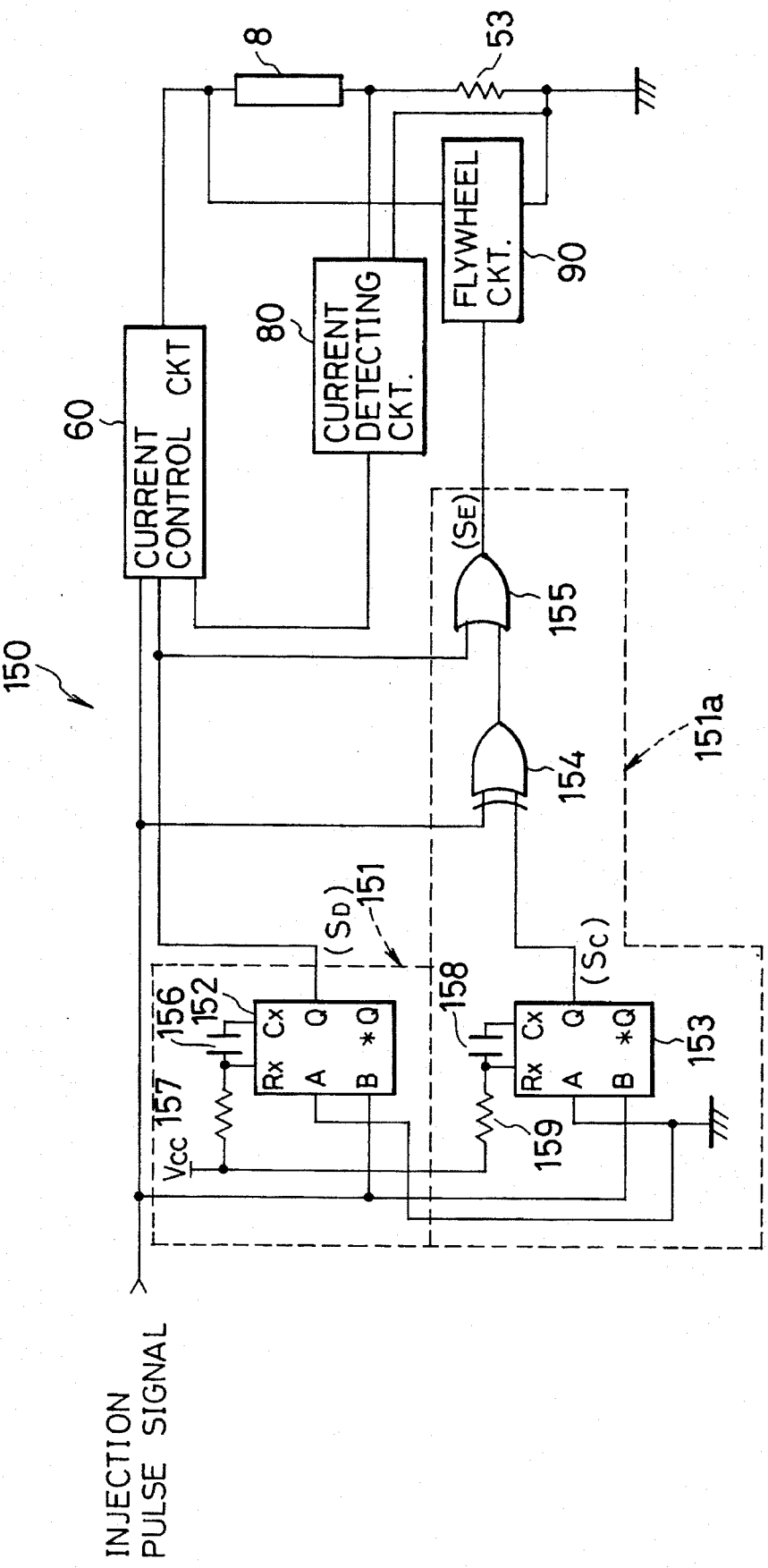
FIG. 8 is a diagrammatic view of a driver circuit for fuel injectors according to a second embodiment of the present invention.
Figure 9:
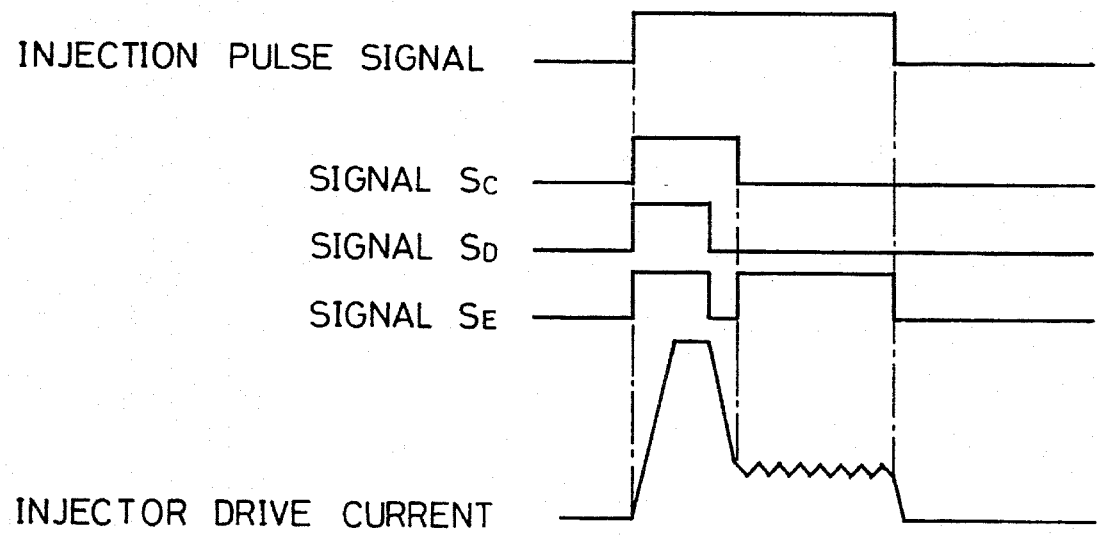
FIG. 9 is a diagram showing wave shapes of signals associated with a second embodiment of the present invention.

FIG. 8 and FIG. 9 are drawings illustrating a second embodiment according to the present invention in which FIG. 8 is a circuit diagram showing an injector drive circuit and FIG. 9 is a diagram showing the wave shapes for signals.

In this second embodiment, an injector drive circuit 150 has been introduced in place of the injector drive circuit 52c of the first embodiment. As shown in FIG. 8, in the injector drive circuit 150, the current control circuit 60, the current detecting circuit 80 and the flywheel circuit 90 are the same as used in the first embodiment and only the timing signal generating circuit 151 which generates timing signals for controlling the operations of the current control circuit 60 and the flywheel circuit 90 differs.

The timing signal generating circuit 151 according to the second embodiment are provided with a monostable circuit (one shot multivibrator) 152 which generates a pulse signal $S_D$ for determining the valve opening current duration to the current control circuit 60 and a control signal generating circuit 151a for controlling the flywheel circuit. The control signal generating circuit 151a comprises a one-shot multivibrator 153 which generates a signal $S_C$ for determining the control timing of the flywheel circuit 90, an EX-OR gate 154 and an OR gate 155.

The abovementioned one shot multivibrators 152 and 153 respectively have terminals $C_X$, $R_X$ for connecting CR (condensers and resistors) which act as determining the width of output pulses and further terminals A, B for inputting trigger inputs. These one shot multivibrators 152 and 153 are capable of retriggering such that injection pulses are inputted to the input terminals B,B respectively when signals rise and trigger pulses are inputted to the grounded input terminals A, A respectively when signals fall.

The terminal $C_X$ of the one shot multivibrator 152 is connected with the negative side of a condenser 156 and the terminal $R_X$ thereof is connected with the positive side of the condenser 156 and with the constant voltage source $V_{CC}$ through a resistor 157. Similarly, the terminal $C_X$ of the one shot multivibrator 153 is connected with the negative side of a condenser 158 and the terminal $R_X$ thereof is connected with the positive side of the condenser 158 and with the constant voltage source $V_{CC}$ through a resistor 159.

The non-inverting output terminal Q of the one shot multivibrator 153 is connected with one input terminal of the aforementioned EX-OR gate 154 and the injection pulse signal is inputted to the other input terminal thereof. Further, the non-inverting output terminal Q of the one shot multivibrator 152 is connected both with the aforementioned current control circuit 60 and with one input terminal of the aforementioned OR gate 155. The other input terminal thereof is connected with an output terminal of the EX-OR gate 154. Further, an output terminal of the OR gate 155 is connected with the aforementioned flywheel circuit 90 to output the control signal $S_E$ for controlling the flywheel circuit. The inverting output terminals *Q, *Q of the one shot multivibrators 152 and 153 respectively are not employed.

In this embodiment, as shown in FIG. 9, when the injection pulse of the high level is inputted, at the rising edge thereof the one shot multivibrator 152 and 153 are triggered respectively and the high level signals $S_D$ and $S_C$ with a given pulse width are respectively outputted from each non-inverting output terminal Q.

The pulse width of the signal $S_D$ outputted from the one shot multivibrator 152 is determined by the condenser 156 and the resistor 157. As in the same way as in the first embodiment, the pulse width determines the period T during which the high current flows through the fuel injector 8. This signal $S_D$ is outputted as a pulse signal for determining a valve opening current duration to the current control circuit 60, thus the fuel injector 8 opens the valve at high speed to inject high pressure fuel directly into the combustion chamber 5 of the engine 1.

On the other hand, the pulse width of the signal $S_C$ outputted from the one shot multivibrator 153 is so determined by the condenser 158 and the resistor 159 as to be longer than that of the signal $S_D$ from the one shot multivibrator 152. When the signal $S_C$ is inputted to the EX-OR gate 154, a signal having an inverted wave of the signal $S_C$ based on an exclusive logical sum of the high level injection pulse signal and the signal $S_C$ is outputted from this EX-OR gate 154.

Accordingly, an output signal of the OR gate 155 to which the signal $S_D$ and the output signal from the EX-OR gate 154 are inputted, namely, the control signal $S_E$ for controlling the flywheel circuit becomes a synthesized signal of the inverted $S_C$ signal and the signal $S_D$, as shown in FIG. 9. The falling edge of this signal $S_C$ becomes the timing for operating the flywheel circuit 90 when the current flowing the fuel injector 8 is decreased from the high current for the valve opening and then the holding current control is started.

Similarly to the first embodiment, as shown in FIG. 4 or FIG. 5, this timing for operating the flywheel circuit 90 has been established before the closed loop for the holding current control is formed in order to make the influence of the delay of the circuit at the transferring process to the holding current control minimum and to minimize the drop of the injector drive current.

In the first embodiment, when the timing signal to the current control circuit 60 and the flywheel circuit 90 is generated, a problem occurs, e.g., since the open collector type comparators 113 and 114 are employed, the rising characteristic from the low (ground) level to the high (a constant voltage $V_{CC}$) level is rather slow. On the other hand, in the second embodiment, since the timing signal is generated without employing the open collector type comparators, the timing signal rises quickly, hence no delay is caused at the rise of the signal $S_E$ which is a timing for operating the flywheel circuit 90, and consequently the flywheel circuit can be operated with a more optimum timing.

Figure 10:
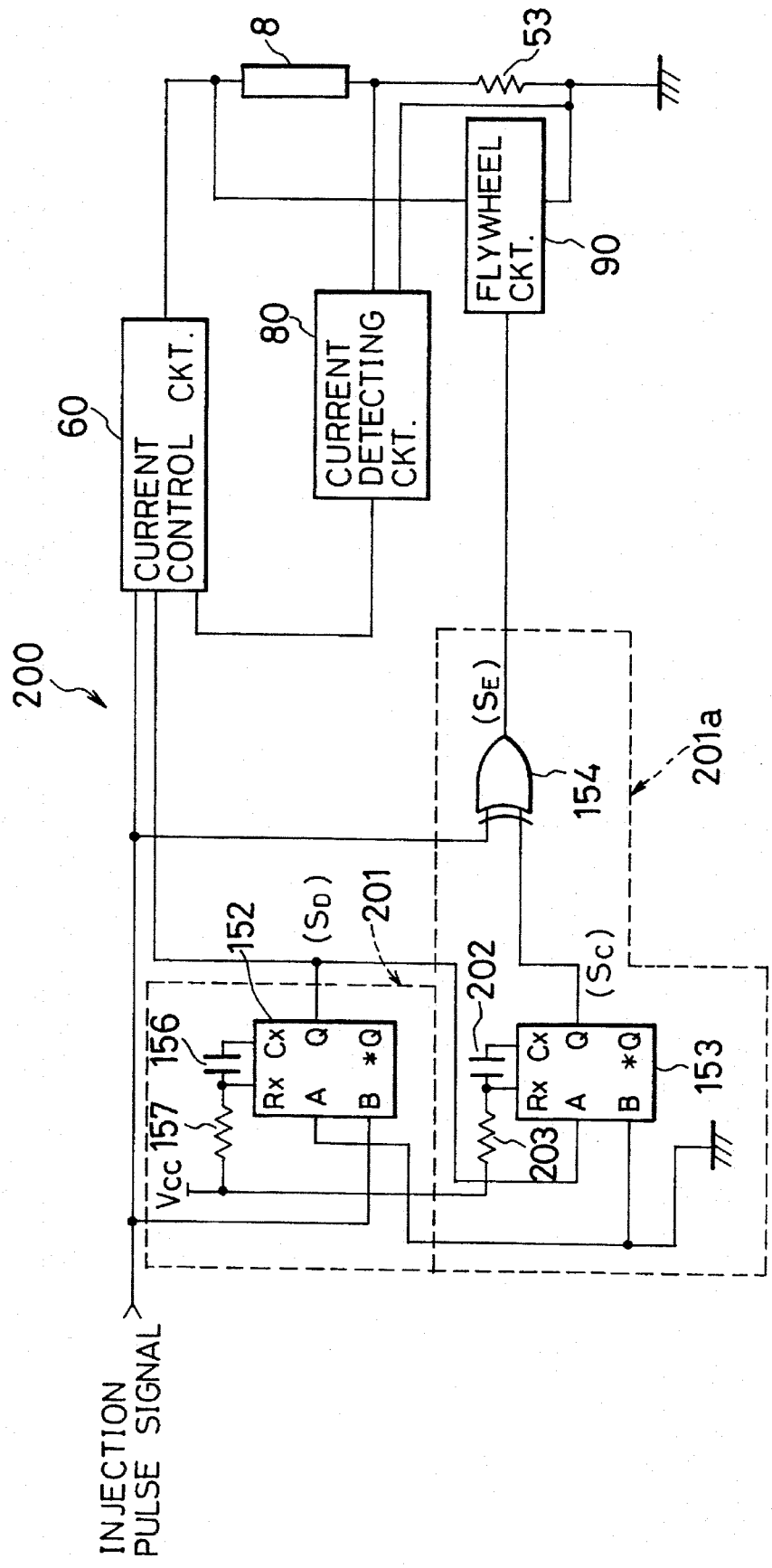
FIG. 10 is a diagrammatic view of a driver circuit for fuel injectors according to a third embodiment of the present invention.
Figure 11:
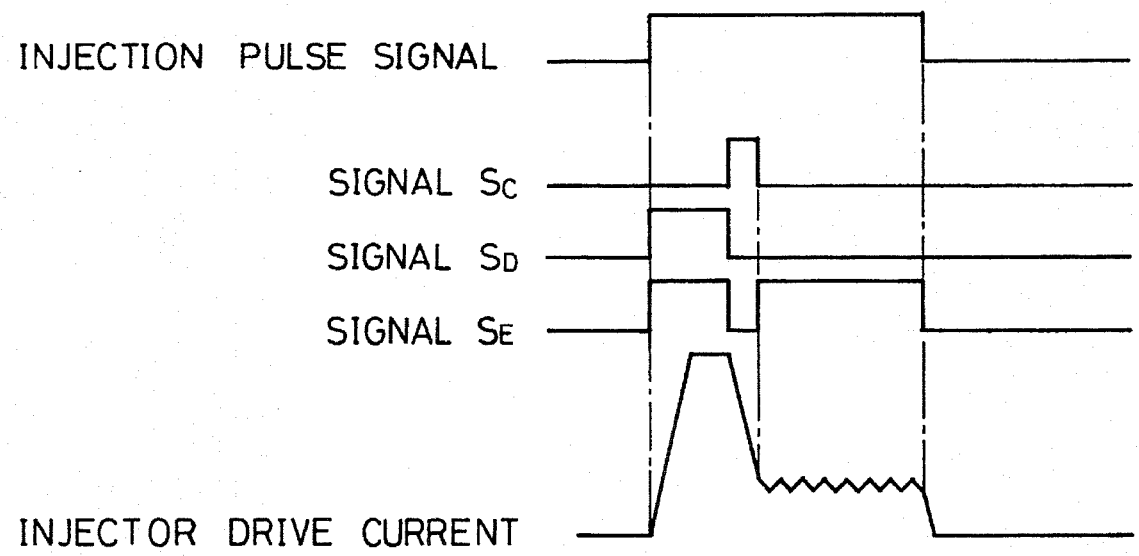
FIG. 11 is a diagram showing wave shapes of signals associated with a second embodiment of the present invention.
Figure 12:
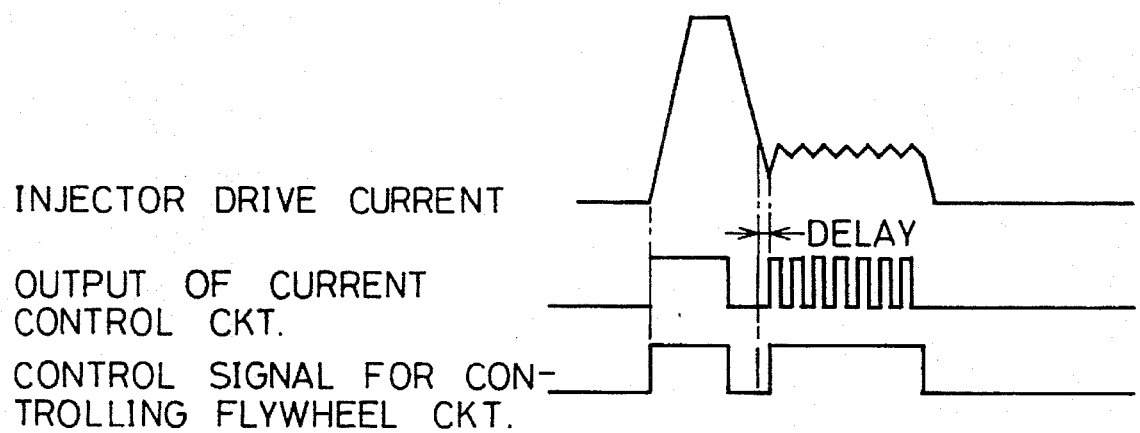
FIG. 12 is a diagram showing wave shapes in a driver circuit for fuel injectors according to the prior art.

FIG. 10 and FIG. 11 are drawings illustrated concerning a third embodiment according to the present invention in which FIG. 10 is a circuit diagram showing an injector drive circuit and FIG. 11 is a diagram showing the wave shapes for signals.

This third embodiment is a fuel injection control system in which the OR gate 155 of the timing signal generating circuit 151 has been omitted from the aforementioned second embodiment and further modifications have been made in the trigger input and the output pulse width of the one shot multivibrator 153 which generates the signal $S_C$ for determining the control timing signal of the flywheel circuit 90.

That is to say, as shown in FIG. 10, in an injector drive circuit 200 according to the third embodiment there is provided with the one shot multivibrator 152 which generates the pulse signal $S_D$ for determining the valve opening current duration to the current control circuit 60 in a timing signal generating circuit 201a and a control signal generating circuit 201a for controlling the flywheel circuit. Further, in the injector drive circuit 200, the OR gate 155 is omitted from the control signal generating circuit 151a for controlling the flywheel circuit of the second embodiment.

The one shot multivibrator 153 of the control signal generating circuit 201 is connected with the non-inverting output terminal Q of the one shot multivibrator 152 which generates the pulse signal $S_D$ for determining the valve opening current duration to the current control circuit 60 through the trigger input terminal A thereof and further connected with ground through the trigger input terminal B thereof to trigger at the rise of signal.

Further, the terminal $C_X$ of the one shot multivibrator 153 is connected with the negative side of a condenser 202 and the terminal $R_X$ thereof is connected with the positive side of the condenser 202 and further with the constant voltage source $V_{CC}$ through a resistor 203. The output signal $S_C$ of the one shot multivibrator 153 and the injection pulse signal are inputted to the EX-OR gate 154 and therefrom the control signal $S_E$ for controlling the flywheel circuit is outputted to the flywheel circuit 90.

Referring to FIG. 11, in this embodiment, when the injection pulse of the high level is inputted, on the rising edge thereof only the one shot multivibrator 152 is triggered and then from the non-inverting output terminal Q a signal $S_D$ having a given pulse width (high level) is outputted. As described before in the first and second embodiments, this signal $S_D$ as a pulse signal for determining the valve opening current duration determines the period T during which the high current passes through the fuel injector 8.

After that, when the signal $S_D$ falls, the current flowing through the fuel injector 8 is made OFF and the current for opening the valve is decreased. At the same time the one shot multivibrator 153 is triggered by the signal SD to output the signal $S_C$ having a pulse width determined by the condenser 202 and the resistor 203. Further, by the exclusive logical sum of the signal $S_C$ and the injection pulse signal, the control signal $S_E$ stepped down to the low level only for the period corresponding to the pulse width of the signal $S_C$ is outputted from the EX-OR gate 154 to the flywheel circuit 90.

Similarly to the aforementioned second embodiment, in this embodiment, the falling edge of the pulse of the output signal $S_C$ from the one shot multivibrator 153 acts as a timing for operating the flywheel circuit 90 when the holding current control is started. The timing has been established before the closed loop for the holding current control is formed in the same manner as in the first and second embodiments so as to minimize the adverse effect of the operational delay of circuits at the transfer process to the holding current control and to minimize a drop of the injector drive current.

Also in this third embodiment, since the timing signal is formed without employing the open collector type comparators, the flywheel circuit 90 can be operated at an optimum timing in the same manner as in the second embodiment. Further, in the first and second embodiments, the signal SC and the pulse signal $S_D$ are independently formed respectively and therefore, when the timing of the pulse signal $S_D$ is adjusted, it is necessary to readjust the timing of the signal $S_C$ too. In this third embodiment, however, since the pulse signal $S_D$ is employed as a trigger signal of the one shot multivibrator 153 for generating the signal $S_C$, when the timing of the pulse signal $S_D$ is adjusted, the generation timing of the signal $S_C$ is automatically changed, whereby it not necessary to make a readjustment on the timing of the signal $S_C$.

In summary, as described before, according to the present invention, after the current for opening the fuel injector is fed thereto, the energization of the fuel injector is stopped to reduce the current to the holding current level for keeping the fuel injector at an open state, the flywheel circuit being inoperative. Before the current passing through the fuel injector falls and reaches the holding current level, i.e., before the closed loop for controlling the current at the holding current level is formed, the flywheel circuit is made operative, whereby the influence of the operational delay of the current control circuit can be reduced and further the current passing through the fuel injector can be swiftly transferred to the holding current level before falling largely.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A fuel injector drive circuit having a flywheel circuit for controlling a drive current of a fuel injector, comprising:

means for raising said drive current from a zero level to a high level so as to open said fuel injector;

means for holding said drive current at said high level for a predetermined time;

means for reducing said drive current from said high level while said flywheel circuit is inoperative;

flywheel circuit control means for generating an operating signal and for operating said flywheel circuit responsive to said signal while said drive current is being reduced; and closed loop control means for holding said drive current at a low level by a closed loop control so as to keep said fuel injector open while said flywheel circuit is operative.

2. The fuel injector drive circuit according to claim 1, wherein said operating signal is a delayed signal of an injection pulse signal.

3. The fuel injector drive circuit according to claim 1, wherein said operating signal is a delayed signal of a signal indicating said high current.

4. The fuel injector drive circuit according to claim 1, wherein said operating signal is an output signal of a comparator for comparing an integrated output of an injection pulse signal with a reference value.

5. The fuel injector drive circuit according to claim 1, wherein said operating signal is an output signal of said closed loop control means.

6. The fuel injector drive circuit according to claim 1, wherein said operating signal is an output signal from a monostable circuit operated by a signal indicating said low current.

7. A method of injecting a fuel directly into a cylinder of an internal combustion engine having, a fuel injector inserted through a cylinder head, a drive circuit for generating a drive current to control said fuel injector, and a flywheel circuit connected to said drive circuit for economizing an electric current of driving said fuel injector and for stabilizing an amount of said fuel to be injected, comprising:

raising said drive current from a zero level to a predetermined high level;

holding said drive current at said high level for a predetermined time period;

reducing said drive current from said high level while said flywheel circuit is inoperative;

operating said flywheel circuit while said drive current is reduced; and holding said drive current at a predetermined low level while said flywheel circuit is operative.

* * * * *